US009377547B2

(12) United States Patent
Williams et al.

(10) Patent No.: US 9,377,547 B2
(45) Date of Patent: Jun. 28, 2016

(54) ANALYZING FRACTURE STRATIGRAPHY (71) Applicant: HALLIBURTON ENERGY SERVICES, INC., Houston, TX (US)

(72) Inventors: Kenneth E. Williams, Houston, TX (US); Jianfu Ma, Sugar Land, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 594 days.

(21) Appl. No.: 13/646,093

(22) Filed: Oct. 5, 2012

(65) Prior Publication Data

US 2014/0100833 A1    Apr. 10, 2014

(51) Int. Cl.
G06F 7/48 (2006.01)
G06F 7/60 (2006.01)
G01V 1/28 (2006.01)

(52) U.S. Cl.
CPC ..................... *G01V 1/288* (2013.01)

(58) Field of Classification Search
CPC ....................................... G01V 1/288
USPC ........................................ 703/10, 2
See application file for complete search history.

(56) References Cited

U.S. PATENT DOCUMENTS

| 8,386,226 | B2 * | 2/2013 | Craig ............................... 703/10 |
| 8,494,827 | B2 * | 7/2013 | Mutlu et al. .................... 703/10 |
| 8,577,660 | B2 * | 11/2013 | Wendt et al. ................... 703/10 |
| 8,600,716 | B2 * | 12/2013 | Bradford ........................ 703/10 |
| 9,009,010 | B2 * | 4/2015 | Ma ..................... G06F 17/5009 703/2 |
| 9,152,745 | B2 * | 10/2015 | Glinsky ............. G06F 17/5009 |
| 2011/0120702 | A1 | 5/2011 | Craig |
| 2011/0120705 | A1 | 5/2011 | Walters et al. |
| 2011/0120706 | A1 | 5/2011 | Craig |
| 2011/0120718 | A1 | 5/2011 | Craig |
| 2011/0125471 | A1 | 5/2011 | Craig et al. |
| 2011/0125476 | A1 | 5/2011 | Craig |
| 2013/0081805 | A1 * | 4/2013 | Bradford et al. ........... 166/250.1 |

FOREIGN PATENT DOCUMENTS

WO    WO2005089404    9/2005
WO    WO2011077223    6/2011

OTHER PUBLICATIONS

PCT/US2011/032741, System and methods for hydraulic fracture characterization using microseismic event data, filed Apr. 15, 2011, 45 pages.
Authorized Officer Luis-Miguel Paredes Sanchez, PCT International Search Report and Written Opinion of the International Searching Authority, PCT/US2013/063547, May 15, 2014, 8 pages.
Laubach, S.E., et al., 2009, Mechanical and Fracture Stratigraphy, AAPG Bulletin, V.93, No. 11, pp. 1413-1426.
Authorized Officer Thorston Vollmer, PCT Written Opinion of the International Preliminary Examining Authority, PCT/US2013/063547, Oct. 17, 2014, 4 pages.
Australian Government IP Australia, Patent Examination Report No. 1, Australian Application No. 2013326838, Apr. 7, 2016, 2 pages.

* cited by examiner

*Primary Examiner* — Kamini S Shah
*Assistant Examiner* — Juan Ochoa
(74) *Attorney, Agent, or Firm* — Holly Soehnge; Fish & Richardson P.C.

(57) ABSTRACT

Systems, methods, and software can be used to calculate fracture stratigraphy of a subterranean zone. In some aspects, microseismic event data associated with a fracture treatment of a subterranean zone are received, and the subterranean zone includes multiple subsurface layers. A filter is used to select a subset of the microseismic event data corresponding to fractures in a particular subsurface layer. Fracture stratigraphy is calculated for the particular subsurface layer from fracture planes associated with the selected subset of the microseismic event data.

15 Claims, 6 Drawing Sheets

ANALYZING FRACTURE STRATIGRAPHY

BACKGROUND

This specification relates to analyzing fracture stratigraphy from microseismic data. Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

SUMMARY

In one general aspect, fracture stratigraphy is calculated from microseismic event data. The microseismic event data may be filtered, for example, to analyze a particular subsurface layer.

In some aspects, a filter is used to select a subset of microseismic event data associated with a subterranean zone that includes multiple subsurface layers. The selected subset of the microseismic event data correspond to fractures in a particular subsurface layer in the subterranean zone. Fracture stratigraphy is calculated for the particular subsurface layer from the selected subset of the microseismic event data.

Implementations may include one or more of the following features. The filter includes parameters that define a specified region within the subsurface layer. Using the filter to select the subset of the microseismic event data includes identifying microseismic events in the specified region. The fracture stratigraphy is calculated for the specified region based on the identified microseismic events. Using the filter to select the subset of the microseismic event data includes identifying microseismic events associated with fracture planes intersecting the specified region. At least one of the fracture planes intersects the specified region and at least one other subsurface layer, and the identified microseismic events include at least one microseismic event in the other subsurface layer.

Additionally or alternatively, these and other implementations may include one or more of the following features. The filter includes filter parameters that define a specified region in the subsurface layer, and the filter parameters define the specified region as a range of vertical depth. A user interface is displayed on a display device. The user interface includes a graphical representation of the subsurface layers and the locations of the microseismic events. A user selection of the filter parameters is received through the user interface.

Additionally or alternatively, these and other implementations may include one or more of the following features. Calculating fracture stratigraphy includes identifying fracture orientations, fracture spacing, or fracture dip angles (or any combination of these) for fractures associated with the particular subsurface layer. The calculated fracture stratigraphy is correlated with mechanical stratigraphy for the particular subsurface layer.

Additionally or alternatively, these and other implementations may include one or more of the following features. The selected subset of the microseismic event data includes some or all or microseismic events in the particular subsurface layer. The selected subset of the microseismic event data includes some or all fracture planes in the particular subsurface layer.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Some aspects of what is described here may be used, for example, to assist in the analysis and interpretation of microseismic event data related to fractures in a subsurface. Fracture stratigraphic parameters may be identified from the interpretation of the microseismic event data, and the fracture stratigraphic parameters can be correlated with mechanical stratigraphic parameters derived, for example, from well logs, seismic attributes, core data, or other sources. Microseismic data can be acquired, for example, as part of a hydraulic fracturing treatment of a well that has been drilled for developing hydrocarbon reserves. Microseismic data are generally associated with low amplitude or low energy seismic events, such as those generated by the hydraulically-induced pressures that have been intentionally introduced (e.g., by a well operator) in the subsurface. The hydraulic fracturing may induce artificial fractures in the subsurface rock, which may, in some instances, enhance the productivity of the reservoir for hydrocarbons.

In some implementations, data are analyzed on a layer-by-layer basis. For example, the layer-by-layer analysis can be used to calculate properties (e.g., orientation, spacing, dip, etc.) of fractures that are induced by hydraulic fracturing, that produce microseismic events, that are identified by any detectors or arrays of receivers, and that have been analyzed for location, magnitude and other attributes. A computational-assisted analysis can use microseismic event data associated with hydraulic fracturing, taking into account the uncertainty in events' location and positioning, to analyze the orientation, spacing and dip information of the induced fractures that are supported by the individual events. The analysis can be tailored to fit datasets that are created from the collection of microseismic monitoring.

The analyses described here, including the data produced by the analyses, can be used in a variety of contexts. The analysis may be used as a more detailed input to a complex fracture model that describes the possible fracture families and their variation within a single well and from one well to another within an area. The analysis may be used as a more detailed input into a mechanical earth model that contains stresses, rock parameters, layering and other information on the structure, stratigraphy and properties of the subsurface. The analysis may be used as a more detailed input into well performance and reservoir models for single-well and multiple well analysis for production rates, drainage analysis and ultimate recovery analysis. The analysis may be used to more directly correlate and calibrate microseismic event data to fracture stratigraphy and mechanical stratigraphy from various datasets. The analysis may allow a more accurate identification and analysis of the various families of fracture trends that are present in different fracture stratigraphic units and their correlation to identifiable mechanical stratigraphic units. There may be multiple families of fractures in the area that was stimulated, each with a separate orientation, dip and spacing (e.g., in the areas where complex fracture networks have been identified, and in other areas). The analyses can be used in other contexts and for other purposes.

In some cases, the analyses described here can be performed in real time, for example, during application of a fracture treatment. Fracture patterns identified from the first stimulation can be used in subsequent stimulations in a layer-by-layer fracture stratigraphic analysis, for example, to see if existing identified fractures continue to be reopened and whether new fracture trends are being intercepted by the fracturing in the well. Data from fracture families associated with other wells can be used to determine if the same fracture trends are being induced in the current stimulation in a layer-by-layer fracture stratigraphic analysis.

In some cases, fracture parameters (e.g., orientation, spacing, dip information, etc.) that are available and imbedded in microseismic data can be identified on a layer-by-layer basis. In some contexts, fracture and mechanical stratigraphy provide a valuable descriptive concepts for the development of fractured reservoirs. Fracture stratigraphy information can be extracted from microseismic data and can be compared with information extracted from other sources (e.g., outcrop, seismic attributes, well logs, cores, etc.). Fracture stratigraphy can also be compared with seismic attributes (e.g., anisotropic velocity, curvature, coherence, amplitude, etc.). Such comparisons may be used to link or otherwise correlate mechanical stratigraphy and fracture stratigraphy. This information can then be available to be correlated to the production history of the well and for further analysis.

In some implementations, a filter (e.g., a vertical filter, or another type of filter) is used in the analysis of microseismic data. For example, the filter may be used to analyze individual subsurface layers, regions within an individual subsurface layer, interfaces between subsurface layers, or other aspects of a subterranean zone. The filter can be adjustable by a user, or the filter can be adjusted in an automated fashion (e.g., to accommodate a particular analysis, a particular data set, or for other reasons). The filter may provide information that allows for the correlation of the microseismic data to the fracture and mechanical stratigraphy of the rocks. For example, microseismic events may be analyzed to identify variations in fracture stratigraphy, which may be related to variations in mechanical properties of the rock layers (e.g., mechanical stratigraphy).

Figure 1A:
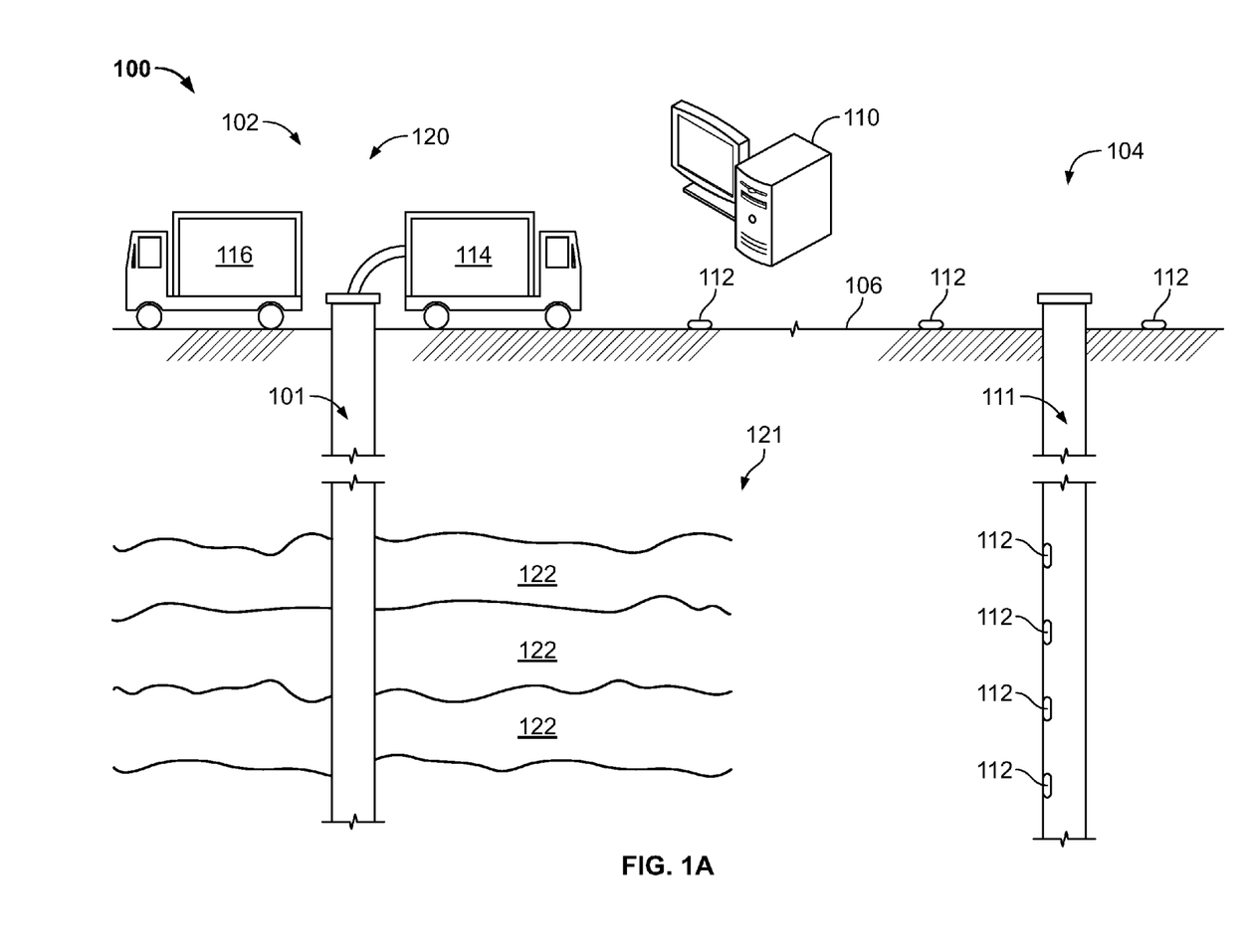
FIG. 1A is a diagram of an example well system.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122.

The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some instances, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single well bore, multiple fluid injection locations in multiple different well bores, or any suitable combination. Moreover, the fracture treatment can inject fluid through any suitable type of well bore, such as, for example, vertical well bores, slant well bores, horizontal well bores, curved well bores, or any suitable combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some instances, the locations of individual microseismic events can be determined based on the microseismic data.

Microseismic events in the subterranean zone 121 may occur, for example, along or near induced hydraulic fractures. The microseismic events may be associated with pre-existing natural fractures or hydraulic fracture planes induced by fracturing activities. In some environments, the majority of detectable microseismic events are associated with shear-slip rock fracturing. Such events may or may not correspond to induced tensile hydraulic fractures that have significant width generation. The orientation of a fracture can be influenced by the stress regime, the presence of fracture systems that were generated at various times in the past (e.g., under the same or a different stress orientation). In some environments, older fractures can be cemented shut over geologic time, and remain as planes of weakness in the rocks in the subsurface.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 112. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data by any suitable means. For example, the computing subsystem 110 can receive the microseismic data by a wired or wireless communication link, by a wired or wireless network, or by one or more disks or other tangible media.

The computing subsystem 110 can be used to analyze fracture stratigraphy. The stratigraphy of rocks in the subsurface can vary laterally and vertically (e.g., where the rocks are stratigraphically layered). The stress regime in the subsurface may vary from layer to layer, for example, due to changes in lithology and local stress variations. The values of parameters (e.g., thickness, Young's Modulus and Poisson's Ratio) can change from one rock unit or part or domain to another. Measures of material properties (e.g., brittleness, ductility, etc.) may indicate units that are favorable for hydraulic fracturing, holding proppant, creating a conductive flow channel, or other purposes.

The computing subsystem 110 can compare fracture stratigraphy with other properties, such as, for example, mechanical stratigraphy. Mechanical stratigraphy may result from differences in lithology, cementation, grain size, total organic matter and other aspects of the subterranean zone 121. Mechanical stratigraphy can be identified or expressed, for example, by properties such as tensile strength, brittleness or other rock properties. Fracture stratigraphy can be identified or expressed, for example, by an appropriate measurable property of the subsurface units (e.g., orientation, spacing, dip, etc.) that changes from unit to unit. Mechanical stratigraphy and fracture stratigraphy may be related, in some instances. Mechanical stratigraphy and fracture stratigraphy may not necessarily coincide, for example, due to the effects of diagenesis, the timing of fracture generation and changes in stress field orientations at different times in the geologic history of the area. For instance, microseismic events that result from hydraulic fracturing may be concentrated in certain intervals or areas (e.g., brittle intervals) and less dense in other areas (e.g., ductile units).

In some implementations, the computing subsystem 110 examines, on a layer-by-layer basis, individual events related to hydraulically induced microfractures. The computing subsystem 110 can use a procedure designed to identify the parameters (e.g., orientation, spacing, dip, etc.) of the induced and natural fracture families that are present in the subsurface and that are manifest by those microseismic events. The analyzed layers may correspond to the individual subsurface layers 122 shown in FIG. 1A, or the analyzed layers may correspond to regions within an individual subsurface layer 122, regions spanning multiple subsurface layers 122, or other regions. The layered nature of the various fracture families that are present in some subsurface formations can be correlated to other information such as well log, sample data and to seismic analysis to further identify and define the units and their variation within the available data set.

The geologic reasonableness of the results can be checked (e.g., by an analyst or an automated process). In some cases, the set of planes with the optimal mathematical degree of fit may not be geologically reasonable, and a different fit may be better for analysis and have a greater geological likelihood for fracture evaluation. In some cases, the numbers on their own may not be properly representative, or of sufficient size, to allow the true values to be determined.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
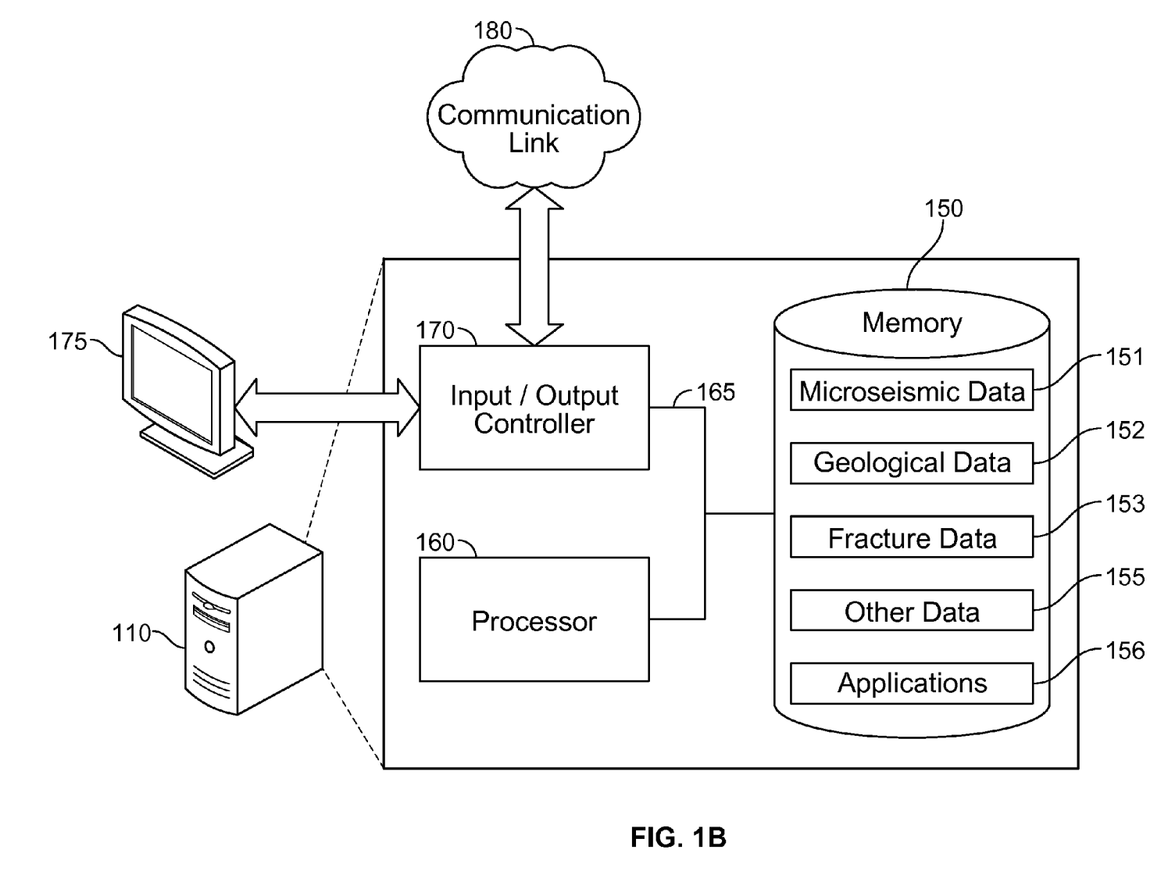
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 153, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include any suitable information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulically-induced fractures, or any other type of discontinuity in the subterranean zone 121. The fracture data 153 can include fracture planes calculated from the microseismic data 151. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG. 4. The applications 156 may include machine-readable instructions for generating a user interface or a plot, such as, for example, those represented in FIG. 2A, 2B, 3A, 3B, 3C, or 3D. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or generate one or more of the interfaces or plots shown in FIG. 2A, 2B, 3A, 3B, 3C, or 3D. The input data received by the processor 160 or the output data generated by the processor 160 can include any of the microseismic data 151, the geological data 152, the fracture data 153, or the other data 155.

Figure 2A:
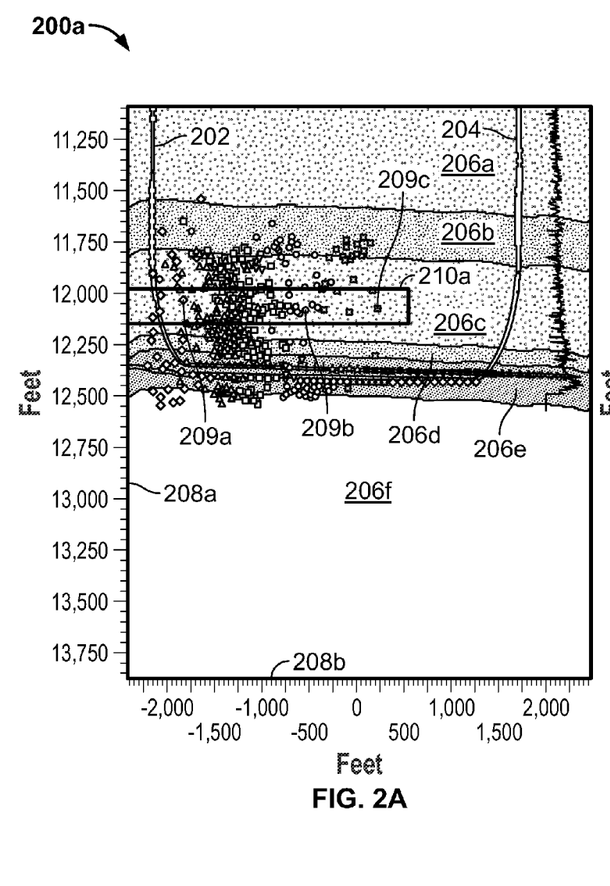
FIGS. 2A and 2B show example screen shots of a software tool for calculating fracture stratigraphy in a subterranean zone.
Figure 2B:
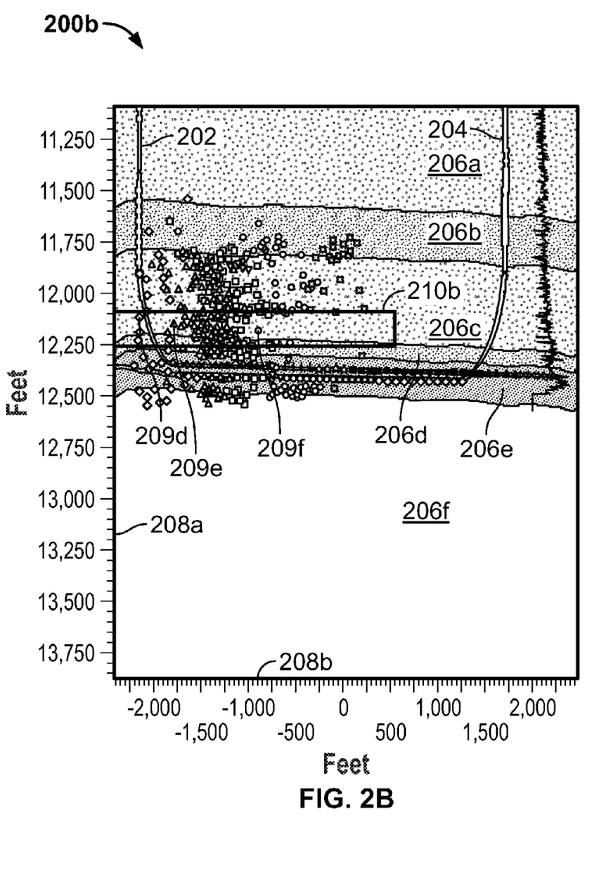

FIGS. 2A and 2B show example screen shots 200a, 200b of a software tool for calculating fracture stratigraphy in a subterranean zone. The example screen shots show a user interface that presents an elevation view of rock layers and microseismic event locations projected onto a plane. The vertical axis 208a represents the vertical depth dimension in a subterranean zone (e.g., distance below the surface, altitude, etc.), and the horizontal axis 208b represents a horizontal dimension in the zone (e.g., corresponding to a range of latitudes, a range of longitudes, or a combination). Data for any suitable subterranean zone can be displayed. The subterranean zone shown in FIGS. 2A and 2B includes multiple subterranean layers 206a, 206b, 206c, 206d, 206e, and 206f, an injection well bore 202, and an observation well bore 204. The subterranean zone can include additional or different features.

The locations of microseismic events within the subterranean zone are plotted in FIGS. 2A and 2B. For example, the data points 209a, 209b, 209c, 209d, 209e, and 209f represent measured microseismic event locations. The screen shot 200a also includes a rectangle 210a representing a microseismic event filter, and screen shot 200b includes a rectangle 210b in a different position representing a different microseismic event filter.

In FIGS. 2A and 2B, the filter is presented as selecting a rectangular region in the subterranean zone. A filter can have any other suitable shape, size, or other attributes. In some implementations, a user can move, reshape, or otherwise reconfigure the filter by interacting (e.g., click and drag) with the rectangle displayed on screen. The user may modify the filter by any other suitable technique, or the filter can include parameters that are pre-selected or determined in an automated fashion.

The shape or color of the data points can indicate the stage of fracture treatment when the microseismic data corresponding to that point was collected—data points having the same shape (e.g., circle, triangle, left square, right triangle, diamond, etc.) were collected during the same fracture treatment stage. In some implementations, data points may be color coded, shaded, or otherwise configured based on the stage of an injection treatment that produced the events, based on the magnitude of the events, based on the error associated with the events, or based on other information. For example, microseismic events recorded during a pad phase may be shaded with a first color, and microseismic events recorded during a proppant-laden phase may be shaded with a second color.

Any appropriate number of microseismic data points can be presented in the user interface. In some implementations, hundreds or thousands of microseismic data points are used. Each microseismic data point can include information on a location associated with a microseismic event and information on a magnitude associated with the microseismic event. The information on the location of the microseismic event may include spatial coordinates (e.g., latitude, longitude, elevation, depth, etc.) that identify a location in the subterranean formation where acoustic data indicates a microseismic event occurred. Acoustic data gathered from one or more locations can be used to identify the location of the microseismic event, for example by triangulation or another technique. The location or the magnitude may be identified based on differences in time of arrival of the detected acoustic signal, absolute or relative magnitudes of the detected acoustic signals, waveform or relative phase differences of the detected acoustic signals, or other properties of the detected acoustic signals. Each data point may additionally include information on a time associated with the microseismic event. For example, the time information may identify an absolute or relative time of occurrence of each microseismic event. Each microseismic data point may additionally include information on an error or uncertainty associated with the measured microseismic event. For example, there may be an error bar associated with the location or the magnitude of each microseismic event.

The filters represented by the rectangles 210a and 210b can be used in analyzing fracture stratigraphy for the subterranean zone. For example, the filter can be imposed to select data points to be used as inputs for calculating the parameters (orientation, spacing, dip, etc.) of the various fracture families. The analysis can be performed on the subset of the data that is present within the filter bounds. Statistics on the orientation, spacing and dip of the fractures that are observed within the filter can be calculated. The filter can then be moved, for example, to a second depth location and the analysis can be performed again. The procedure can be performed iteratively, for example, until the analysis has been performed over the entire dataset.

Fractures may be analyzed by any suitable technique. Fracture stratigraphy, which can be represented as a statistical variation in the number and characteristics of the fracture families, can be correlated with mechanical stratigraphy, which can be extracted from well log and seismic attributes. In some instances, the various filters can overlap. The overlap can be adjusted by the user, or it can be adjusted automatically by a predefined user rule. The size of the filter can be adjusted by the user, or by an automatic computational facility. A structure map can be used to shape the top and base of the depth filter so that the analysis can follow the stratigraphy of the units in the subsurface. The analysis can be performed by use of a moving filter and adjusting its size for each stage of hydraulic fracturing separately. The analysis can be performed on various subsets of the hydraulic fracturing stages. The analysis can be performed to the limit of the resolution of the data, and in some cases, the analysis can become more accurate as the resolution or confidence (or both) of the microseismic data is improved.

The results of the analysis can be presented to the user, for example, in a graphical user interface or by another means. In some instance, geological information on the subterranean zone and the fractured unit can be used to identify possible combinations that are most likely to be valid and those that may not be valid. In some instances, the microseismic dataset itself does not provide a complete description of the hydraulic fracturing since very small events may be below the resolution of the instrumentation. As such, the dataset may be incomplete or biased by the acquisition and processing process. In some cases, such factors can be removed or compensated for. The geologic history of the subterranean zone can be considered in the analysis stage, for example, where fractures were generated at an earlier time when the stress regime may have been different from the present stress regime.

In some cases, brittle and ductile units can have different fracture patterns (e.g., orientation, spacing, dip, etc.) and the families of faults can vary between the various vertical units in the stratigraphic column. Some fracture patterns are the summation of the geologic and tectonic events that the rock has been subjected to in its history, and the effects of the hydraulic fracturing that is influenced by the present-day stress regime.

In some types of subterranean zones, complexes of multiple fracture families can result from a complex geologic history, and simpler patterns (e.g., with only one fracture family) may result from a simpler geologic history. The present-day state of stress can vary from isotropic to strongly anisotropic. In the isotropic stress regime, the stress is similar in magnitude for both horizontal directions and the maximum and minimum horizontal stresses are approximately equal. In the isotropic case, hydraulic fracturing can open or reopen a complex fracture network. As the stress anisotropy increases with the maximum horizontal stress value being much greater than the minimum stress value, the induced hydraulic fracture may tend to become more planar and similar to a simple bi-wing fracture. These and other types of stress regimes can produce similar or different types of fracture patterns.

In some cases, in a more ductile unit in the fracture stratigraphic column, fractures may be uniformly distributed, or they may be distributed no distinct fracture pattern. In the case of isotropic present-day stresses, the fracture pattern can be substantially symmetrical. In the case where there is a strongly anisotropic stress pattern, the resulting induced hydraulic fracture can be much more similar to a bi-wing fracture. These and other types of stress regimes can produce similar or different types of fracture patterns.

FIGS. 3A, 3B, 3C, and 3D are plots of example fracture planes of a subterranean zone. The plots shown in FIGS. 3A, 3B, 3C, and 3D show examples of fracture planes generated based on microseismic data. Other types of fracture planes or fracture families, which may include fracture planes that are different from those shown in the figures, can be generated based on microseismic data. A fracture plane can have any suitable size, shape, geometry, or spatial relationship with other fracture planes.

Fracture planes may be plotted in any suitable axis system, using any suitable graphical representation. The plots 300a, 300b, 300c, and 300d shown in FIGS. 3A, 3B, 3C, and 3D, respectively, each include three axes—a horizontal north axis, a horizontal east axis, and a vertical depth axis. Each set of axes represents a geological layer in a subterranean zone. The example plots shown in the figures include points representing microseismic events, and bounded surfaces representing fracture planes.

Each fracture plane is represented in the plots 300a, 300b, 300c, 300d by a surface extending through three dimensions. The fracture planes can be calculated by any suitable technique, for example, using any suitable software or algorithm.

A fracture plane can be generated, for example, by fitting the parameters of a plane (e.g., the parameters a, b, c, and d of the plane $ax+by+zy+d=0$) to the spatial coordinates of the microseismic data points. Example techniques for fitting the parameters of a plane to spatial coordinates include Chi-squared fitting and others. In some implementations, fracture planes can be generated from microseismic seismic data as described in PCT App. No. PCT/US2011/032741, filed on Apr. 15, 2011, entitled "Systems and methods for hydraulic fracture characterization using microseismic event data."

Figure 3A:
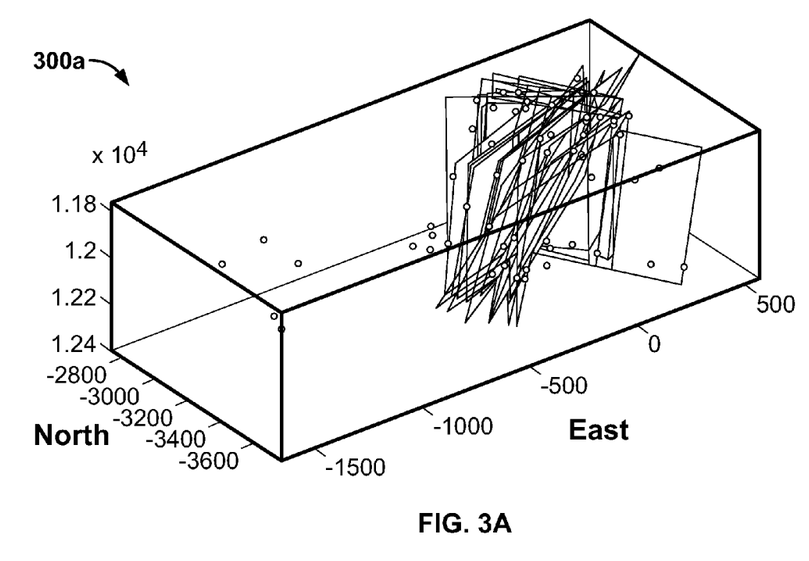
FIGS. 3A-3D are plots of example fracture planes of a subterranean zone.
Figure 3B:
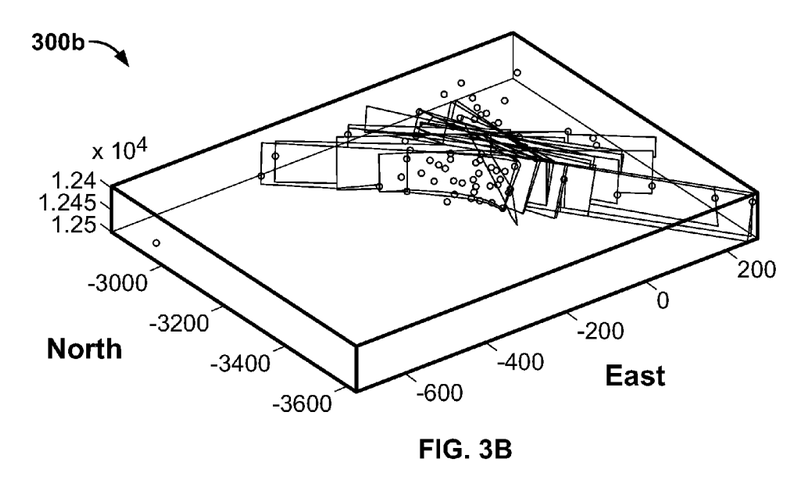

FIGS. 3A and 3B shows analyses of a fracture stage from a well that is located in the Haynesville-Bossier play. The plot 300a in FIG. 3A represents fracture planes in the Bossier formation; the subsurface layer represented in the plot 300a was selected by a filter. The subsurface layer spans a vertical depth from 11300 to 12400 feet. The plot 300a shows 48 planes generated with high confidence from 203 selected microseismic events in the subsurface layer. The plot 300a in FIG. 3A shows fracture planes for three fracture families. The three fracture families have the fracture stratigraphy attributes shown in Tables 3A-1, 3A-2, and 3A-3 below.

TABLE 3A-1

| Family 1 | | Planes | | Events | |
|---|---|---|---|---|---|
| N48° E | | 16 (33%) | | 114 (56%) | |
| Strike | | Dip | | Spacing | |
| Mean | STD | Mean | STD | Mean | STD |
| 47.77 | 6.41 | 72.48 | 8.41 | 29.31 | 14.16 |

TABLE 3A-2

| Family 2 | | Planes | | Events | |
|---|---|---|---|---|---|
| N71° E | | 15 (31%) | | 109 (54%) | |
| Strike | | Dip | | Spacing | |
| Mean | STD | Mean | STD | Mean | STD |
| 70.76 | 3.21 | 74.01 | 9.77 | 22.73 | 7.58 |

TABLE 3A-3

| Family 3 | | Planes | | Events | |
|---|---|---|---|---|---|
| N33° W | | 12 (25%) | | 78 (38%) | |
| Strike | | Dip | | Spacing | |
| Mean | STD | Mean | STD | Mean | STD |
| 327.20 | 5.08 | 75.52 | 7.62 | 20.26 | 7.61 |

The plot 300b in FIG. 3B represents fracture planes in the Haynesville shale section; the subsurface layer represented in the plot 300b was selected by a filter. The subsurface layer spans a vertical depth from 12400 to 12500 feet. The plot 300b shows 48 planes generated with high confidence from 208 selected microseismic events in the subsurface layer. The plot 300b in FIG. 3B shows fracture planes for three fracture families. The three fracture families have the fracture stratigraphy attributes shown in Tables 3B-1, 3B-2, and 3B-3 below.

TABLE 3B-1

| Family 1 | | Planes | | Events | |
|---|---|---|---|---|---|
| N34° W | | 24 (50%) | | 135 (65%) | |
| Strike | | Dip | | Spacing | |
| Mean | STD | Mean | STD | Mean | STD |
| 325.91 | 5.09 | 75.53 | 10.45 | 18.40 | 6.98 |

TABLE 3B-2

| Family 2 | | Planes | | Events | |
|---|---|---|---|---|---|
| N13° W | | 9 (19%) | | 107 (51%) | |
| Strike | | Dip | | Spacing | |
| Mean | STD | Mean | STD | Mean | STD |
| 347.15 | 5.80 | 72.51 | 9.90 | 31.92 | 22.82 |

TABLE 3B-3

| Family 3 | | Planes | | Events | |
|---|---|---|---|---|---|
| N51° W | | 8 (17%) | | 81 (39%) | |
| Strike | | Dip | | Spacing | |
| Mean | STD | Mean | STD | Mean | STD |
| 308.74 | 3.25 | 75.25 | 9.36 | 22.28 | 11.51 |

As mentioned above, FIG. 3A represents fracture planes identified for the Bossier formation, and FIG. 3B represents fracture planes identified for the Haynesville shale section. The fracture planes in FIGS. 3A and 3B were identified in the same well and in the same hydraulic fracture stage. As demonstrated by a comparison of the plots, the two subsurface layers display a different set of fracture families with different characteristics of orientation, spacing and dip. The orientations of the three families are somewhat similar but the dominance of one set as compared to another is appreciably different. Such differences can be identified, for example, by applying appropriate filters to the fracture stratigraphy calculations, and possible causes for those differences can be analyzed from the data.

There is not always a difference in the orientation, spacing and dip of the various fracture families that are present in different units in a well. For example, FIGS. 3C and 3D show similarity between the fracture families that are observed in the Austin chalk and the Eagle Ford units in a south Texas well data set.

Figure 3C:
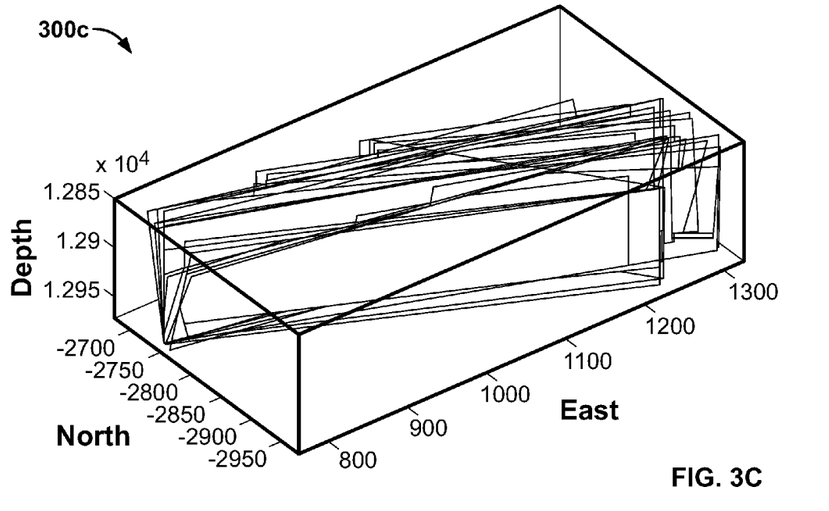
Figure 3D:
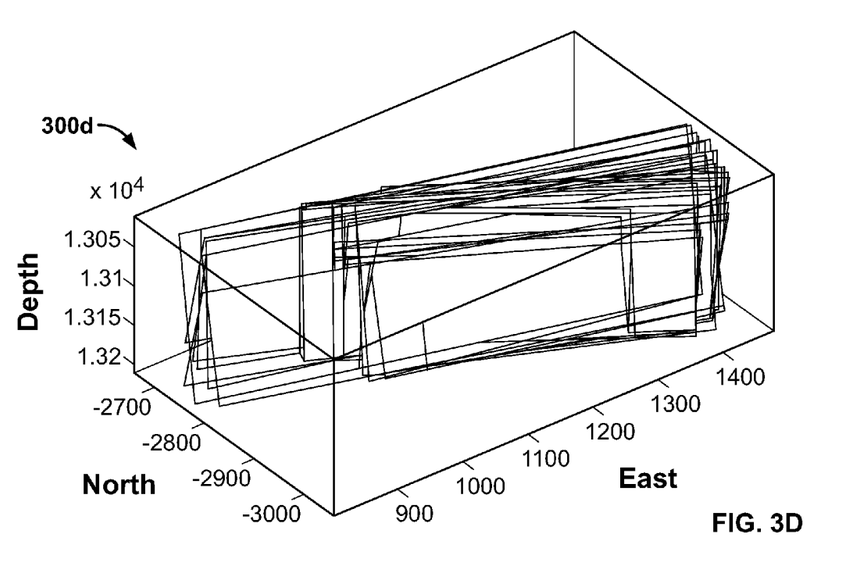

The plot 300c in FIG. 3C represents fracture planes in the Austin chalk unit; the subsurface layer represented in the plot 300c was selected by a filter. The subsurface layer spans a vertical depth from 12800 to 12970 feet. The plot 300c shows 40 planes generated with high confidence from 92 selected microseismic events in the subsurface layer. The plot 300c in FIG. 3C shows fracture planes for two fracture families. The two fracture families have the fracture stratigraphy attributes shown in Tables 3C-1 and 3C-2 below.

TABLE 3C-1

| Family 1 | | Planes | | Events | |
|---|---|---|---|---|---|
| N64.5° W Strike | | 15 (38%) Dip | | 67 (73%) Spacing | |
| Mean | STD | Mean | STD | Mean | STD |
| 115.48 | 5.69 | 73.86 | 10.1 | 17.06 | 8.94 |

TABLE 3C-2

| Family 2 | | Planes | | Events | |
|---|---|---|---|---|---|
| N65.4° W Strike | | 13 (33%) Dip | | 55 (60%) Spacing | |
| Mean | STD | Mean | STD | Mean | STD |
| 294.57 | 5.64 | 73.81 | 7.31 | 16.13 | 6.38 |

The plot 300d in FIG. 3D represents fracture planes in the Eagle Ford unit; the subsurface layer represented in the plot 300d was selected by a filter. The subsurface layer spans a vertical depth from 13000 to 13210 feet. The plot 300d shows 60 planes generated with high confidence from 272 selected microseismic events in the subsurface layer. The plot 300d in FIG. 3D shows fracture planes for two fracture families. The two fracture families have the fracture stratigraphy attributes shown in Tables 3D-1 and 3D-2 below.

TABLE 3D-1

| Family 1 | | Planes | | Events | |
|---|---|---|---|---|---|
| N61.2° W Strike | | 42 (70%) Dip | | 183 (67%) Spacing | |
| Mean | STD | Mean | STD | Mean | STD |
| 118.85 | 6.16 | 72.44 | 8.60 | 20.46 | 9.36 |

TABLE 3D-2

| Family 2 | | Planes | | Events | |
|---|---|---|---|---|---|
| N62.6° W Strike | | 10 (17%) Dip | | 113 (42%) Spacing | |
| Mean | STD | Mean | STD | Mean | STD |
| 297.44 | 5.31 | 77.23 | 9.49 | 19.08 | 8.27 |

As mentioned above, FIG. 3C represents fracture planes identified for the Austin Chalk unit, and FIG. 3B represents fracture planes identified for the Eagle Ford unit. The fracture planes in FIGS. 3C and 3D were identified in the same well and in the same hydraulic fracture stage. As demonstrated by a comparison of the plots, the two subsurface layers display a similar set of fracture families with similar characteristics of orientation, spacing and dip. Such similarities can be identified, for example, by applying appropriate filters to the fracture stratigraphy calculations, and possible causes for those differences can be analyzed from the data.

Any suitable fractures or fracture families can be analyzed. In some cases, there may be multiple events that have generated crossing sets of natural fractures. These may or may not be presently partially open or cemented shut. These fracture patterns can be impacted by the hydraulic fracturing and the microseismic events follow these trends. In any cloud of microseismic data, even the complex clouds, there may be evidence remaining of those natural fractures that can be detected by analysis of the events. This can also be true of the fracture and mechanical stratigraphy, which may be detectable at the resolution of the microseismic data.

Figure 4:
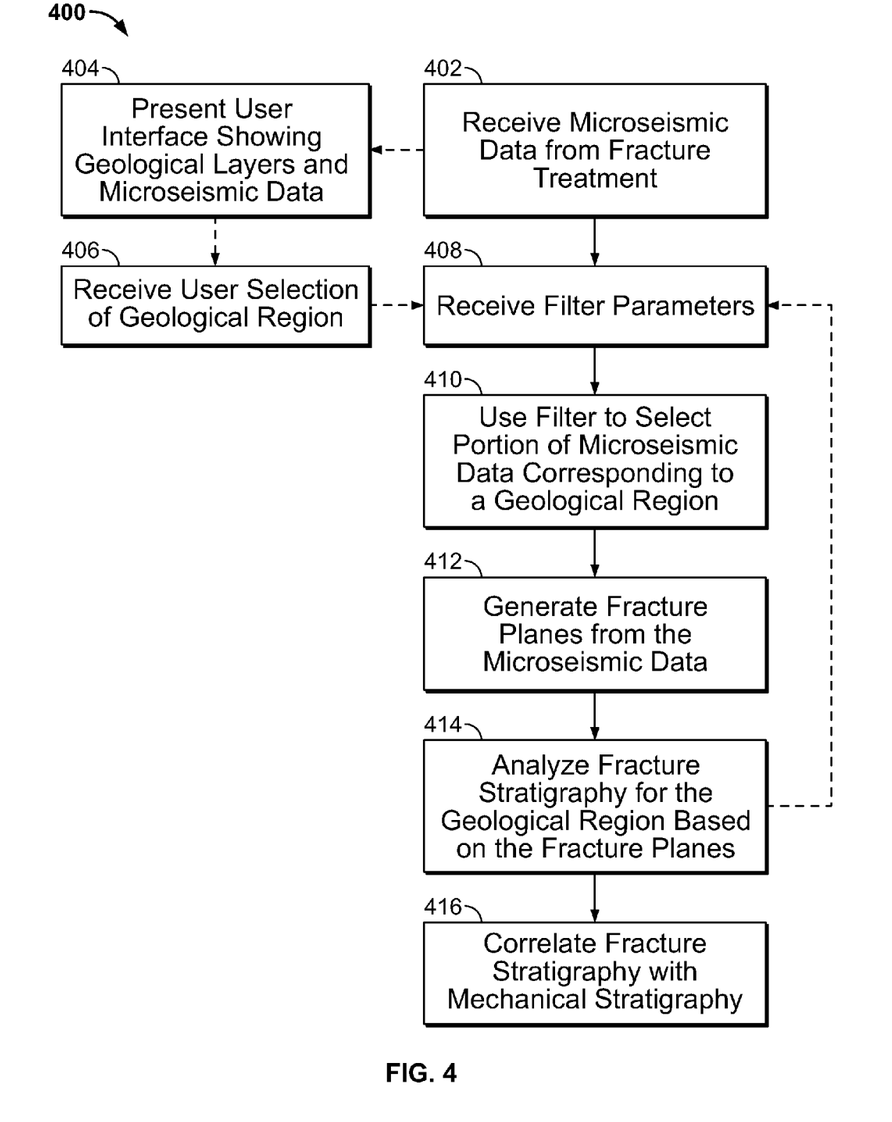
FIG. 4 is a flow chart of an example technique for calculating fracture stratigraphy.

FIG. 4 is a flow chart of an example process 400 for calculating fracture stratigraphy. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

At 402, microseismic data from a fracture treatment are received. For example, the microseismic data can be received from memory, from a remote device, or another source. The microseismic event data may include information on the measured locations of multiple microseismic events, information on a measured magnitude of each microseismic event, information on an uncertainty associated with each microseismic event, information on a time associated with each microseismic event, etc. The microseismic event data can include microseismic data collected at an observation well, at a treatment well, at the surface, or at other locations in a well system. Microseismic data from a fracture treatment can include data for microseismic events detected before, during, or after the fracture treatment is applied. For example, in some instances, microseismic monitoring begins before the fracture treatment is applied, ends after the fracture treatment is applied, or both.

At 408, filter parameters are received. The filter parameters can include any suitable information on parameters of a filter to be applied in an analysis of the microseismic data. The filter parameters can identify a particular subsurface layer for analysis. For example, the filter parameters can identify a range of depths in a subterranean zone or a particular rock unit or formation in a subterranean zone. The filter can have any suitable shape or geometry. For example, the filter can represent a three-dimensional volume or a two-dimensional area. The filter can have an infinite extent in one or more dimensions (e.g., the filter have no boundary in one or more horizontal directions), or the filter can define a bounded area or volume. The filter can be a rectangular, trapezoidal, ellipsoidal, or any suitable regular or irregular two-dimensional shape. The filter can be a prism, a frustum, a spheroid, or any suitable regular or irregular three-dimensional shape.

The filter can include additional or different parameters, for example, other than the parameters identifying a subsurface region. For example, the filter can identify a range of times, uncertainties, amplitudes, or other parameters of microseismic events to be selected for or removed from the analysis. As another example, the filter can identify fracture planes or fracture planes to be selected for or removed from the analysis.

The filter parameters can be generated by any suitable technique. For example, the filter parameters can be pre-selected, or they may be automatically calculated from other data. As shown in FIG. 4, the filter parameters may, in some instances, be generated based on user input. For example, at 404, a user interface can be presented, and at 406 a user selection of a geological region can be received through the user interface. The user interface can be similar to the user interface shown in FIGS. 2A and 2B, or another type of user interface can be used. The user can select a filter or filter parameters by indicating a subsurface region on the graphical user interface, by indicating a rock formation or rock unit of interest, by entering a values representing a vertical range in the formation, or the user can select a filter or filter parameters in another manner.

At 410, the filter is used to select a portion of the microseismic data corresponding to the geological region. The filter may select all microseismic events in the geological region, or the filter may select less than all microseismic events in the geological region. The filter may select all fracture planes intersecting the geological region, or the filter may select less than all microseismic events associated with fracture planes intersecting the geological region. The filter may select microseismic events corresponding to a particular fracture treatment or a particular phase of a fracture treatment. The filter may select events having certain amplitudes, locations, uncertainties, or other parameters.

At 412, fracture planes are generated from the microseismic data. The fracture planes can be generated by any suitable technique. In some instances, the fracture planes are generated by a fully automated algorithm. A fracture plane can be a plane or other surface extending in a three dimensional coordinate system. A fracture plane can be a flat surface, or a fracture plan can include turns, curves, edges, or other features. A fracture plane can be a bounded surface that has well-defined boundaries and finite extent. Or in some instances, a fracture plane can be represented as an unbounded surface, having an infinite extent in one or more dimensions.

In some cases, the fracture planes are generated from microseismic data before the filter is applied. For example, the fracture planes can be generated from all or part of the microseismic data, and the filter can be applied to select fracture planes intersecting the geological region indicated by the filter parameters.

At 414, fracture stratigraphy is analyzed for the geological region based on the fracture planes. The fracture stratigraphy can be calculated, for example, by calculating the dip angle for each fracture plane, calculating the strike angle for each fracture plane, calculating the spacing of the fracture planes, or by performing any combination of these and other calculations.

The dip angle of a fracture plane can represent the angle between the fracture plane and the horizontal plane (e.g., the xy-plane). The strike angle can represent the angle between a horizontal reference axis (e.g., the x-axis) and a horizontal line where the fracture plane intersects the horizontal plane. For example, the strike angle can be defined with respect to North or another horizontal reference direction. A fracture plane can be defined by other parameters, including angular parameters other than the strike angle and dip angle. In some implementations, the strike angle and the dip angle of a fracture plane can be identified based on microseismic data as described in PCT App. No. PCT/US2011/032741, filed on Apr. 15, 2011, entitled "Systems and methods for hydraulic fracture characterization using microseismic event data."

The fracture spacing can indicate an average spacing between fractures in a geological region. The fracture spacing can be calculated, for example, for individual fracture sets, families, or other groups of fractures. In some types of formations, fractures tend to form in sets oriented within approximately sixty degrees of each other. Some formations include multiple sets of fractures. For example, a formation may include a first set of fractures having a primary orientation, which may be dictated by a maximum stress direction. A formation may also include a second set of fractures having a secondary orientation, which is different from the primary orientation. The secondary orientation may be separated from the primary orientation, for example, by any suitable angle.

In some implementations, fracture stratigraphy can be calculated by statistical analysis of the parameters of fracture planes in the geological region. For example, the fracture stratigraphy can be calculated by calculating a mean, median, standard deviation, range, or other statistical parameters of the fracture dip, strike, spacing, or other fracture plane parameters. The fracture stratigraphy can include statistical parameters for groups of fracture planes, parameters of individual fracture planes, or any suitable combination. Examples of fracture stratigraphy information are provided in Tables 3A-1, 3A-2, 3A-3, 3B-1, 3B-2, 3B-3, 3C-1, 3C-2, 3D-1, and 3D-2. Additional or different types of information can be produced by calculating fracture stratigraphy.

At 416, the fracture stratigraphy is correlated with mechanical stratigraphy. Correlating fracture stratigraphy and mechanical stratigraphy can include comparing spatial variations in fracture stratigraphy with spatial variations in the mechanical properties of the rock. For example, spatial variations in fracture dip, strike, and spacing can be compared with spatial variations in rock brittleness, stress, density, porosity, etc.

In addition (or as an alternative) to correlating the fracture stratigraphy with mechanical stratigraphy, the calculated fracture stratigraphy can be compared to other fracture stratigraphy information. For example, fracture stratigraphy data can be compared for multiple different geological regions in the subterranean zone, for multiple different phases of an injection treatment in the same geological region, for multiple different injection wells in a subterranean zone, for multiple different subterranean zones, or any suitable combination.

As shown in FIG. 4, the process may be iterated or repeated, for example, to analyze fracture stratigraphy for multiple different geological regions. The analyzed regions may overlap, or non-overlapping regions can be analyzed. In some instances, distinct sub-regions within a rock formation or rock unit can be analyzed separately on each iteration. In some instances, distinct rock formations or rock units can be analyzed separately on each iteration. Any group or subgroup of the operations shown in FIG. 4 can be iterated in any suitable manner, for a variety of purposes.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:
1. A computer-implemented method for identifying fracture stratigraphy based on microseismic data, the method comprising:
receiving microseismic event data associated with a fracture treatment of a subterranean zone, the subterranean zone including a plurality of subsurface layers;
using a filter to select a subset of the microseismic event data, the selected subset of the microseismic event data associated with a particular subsurface layer in the subterranean zone, wherein the filter includes filter parameters that define a specified region within the particular subsurface layer, wherein using the filter to select the subset of the microseismic event data includes identifying microseismic events in the specified region;
generating, by data processing apparatus, a plurality of fracture planes based on the selected subset of microseismic event data associated with the identified microseismic events in the specified region within the particular subsurface layer;
calculating, by data processing apparatus, a fracture stratigraphy for the particular subsurface layer, wherein the fracture stratigraphy is calculated from the fracture planes generated using the selected subset of the microseismic event data associated with the identified microseismic events in the specified region within the particular subsurface layer; and
correlating the calculated fracture stratigraphy with mechanical stratigraphy for the particular subsurface layer, wherein correlating the calculated fracture stratigraphy with mechanical stratigraphy for the particular subsurface layer comprises comparing spatial variations in the calculated fracture stratigraphy with spatial variations in mechanical properties of rock in the particular subsurface layer of the subterranean zone; and controlling an injection treatment based on the calculated fracture stratigraphy.

2. The method of claim 1, wherein using the filter to select the subset of the microseismic event data includes identifying microseismic events associated with fracture planes intersecting the specified region, and the fracture stratigraphy is calculated for the specified region based on the identified microseismic events associated with fracture planes intersecting the specified region.

3. The method of claim 2, wherein at least one of the fracture planes intersects the specified region and at least one other subsurface layer, and the identified microseismic events include at least one microseismic event in the other subsurface layer.

4. The method of claim 1, wherein the filter parameters define the specified region as a range of vertical depth.

5. The method of claim 1, further comprising:
generating a user interface that includes a graphical representation of the particular subsurface layer of the subterranean zone and locations of microseismic events; and
receiving, through the user interface, a user selection of the filter parameters.

6. The method of claim 1, wherein calculating fracture stratigraphy comprises at least one of:
generating a statistical description of fracture orientations for fracture planes associated with the particular subsurface layer;
generating a statistical description of fracture spacing for fracture planes associated with the particular subsurface layer; or
generating a statistical description of fracture dip angles for fracture planes associated with the particular subsurface layer.

7. The method of claim 1, wherein the selected subset of the microseismic event data includes all microseismic events in the particular subsurface layer.

8. The method of claim 1, wherein the selected subset of the microseismic event data includes a less than all microseismic events in the particular subsurface layer.

9. The method of claim 1, wherein the selected subset of the microseismic event data includes all fracture planes in the particular subsurface layer.

10. The method of claim 1, wherein the selected subset of the microseismic event data includes a less than all fracture planes in the particular subsurface layer.

11. A non-transitory computer-readable medium encoded with instructions that, when executed by data processing apparatus, perform operations comprising:
receiving microseismic event data associated with a fracture treatment of a subterranean zone, the subterranean zone including a plurality of subsurface layers;
using a filter to select a subset of the microseismic event data, the selected subset of the microseismic event data associated with fracture planes in a particular subsurface layer in the subterranean zone, wherein the filter includes filter parameters that define a specified region within the particular subsurface layer, wherein using the filter to select the subset of the microseismic event data includes identifying microseismic events in the specified region;
generating a plurality of fracture planes based on the selected subset of microseismic event data associated with the identified microseismic events in the specified region within the particular subsurface layer;
calculating a fracture stratigraphy for the particular subsurface layer, wherein the fracture stratigraphy is calculated from the fracture planes generated using the selected subset of the microseismic event data associated with the identified microseismic events in the specified region within the particular subsurface layer; and
correlating the calculated fracture stratigraphy with mechanical stratigraphy for the particular subsurface layer, wherein correlating the calculated fracture stratigraphy with mechanical stratigraphy for the particular subsurface layer comprises comparing spatial variations in the calculated fracture stratigraphy with spatial variations in mechanical properties of rock in the particular subsurface layer of the subterranean zone; and
controlling an injection treatment based on the calculated fracture stratigraphy.

12. The computer-readable medium of claim 11, wherein the filter includes parameters that define a specified region within the particular subsurface layer, using the filter to select the subset of the microseismic event data includes identifying microseismic events associated with fracture planes intersecting the specified region, and the fracture stratigraphy is calculated for the specified region based on the identified microseismic events.

13. The computer-readable medium of claim 11, wherein calculating fracture stratigraphy comprises at least one of:
generating a statistical description of fracture orientations for fracture planes associated with the particular subsurface layer;
generating a statistical description of fracture spacing for fracture planes associated with the particular subsurface layer; or
generating a statistical description of fracture dip angles for fracture planes associated with the particular subsurface layer.

14. A system comprising:
a computer-readable non-transitory medium that stores microseismic event data associated with a fracture treatment of a subterranean zone, the subterranean zone including a plurality of subsurface layers; and
data processing apparatus operable to:
use a filter to select a subset of the microseismic event data, the selected subset of the microseismic event data associated with a particular subsurface layer of a plurality of subsurface layers in the subterranean zone, wherein the filter includes filter parameters that define a specified region within the particular subsurface layer, wherein using the filter to select the subset of the microseismic event data includes identifying microseismic events in the specified region;
generate a plurality of fracture planes based on the selected subset of microseismic event data associated with the identified microseismic events in the specified region within the particular subsurface layer;
calculate a fracture stratigraphy for the particular subsurface layer, wherein the fracture stratigraphy is calculated from the fracture planes generated using the selected subset of the microseismic event data associated with the identified microseismic events in the specified region within the particular subsurface layer; and
correlate the calculated fracture stratigraphy with mechanical stratigraphy for the particular subsurface layer, wherein correlating the calculated fracture stratigraphy with mechanical stratigraphy for the particular subsurface layer comprises comparing spatial variations in the calculated fracture stratigraphy with spatial variations in mechanical properties of rock in the particular subsurface layer of the subterranean zone; and
control an injection treatment based on the calculated fracture stratigraphy.

15. The system of claim 14, wherein the data processing apparatus is further operable to generate a user interface that includes a graphical representation of the subsurface layers of the subterranean zone and locations of microseismic events, and the system further comprises a display device operable to:
   display the user interface; and
   receive a user selection of parameters of the filter.

\* \* \* \* \*